United States Patent
Chatterjee et al.

(10) Patent No.: US 8,954,447 B1
(45) Date of Patent: Feb. 10, 2015

(54) ANNOTATION-BASED CONTENT RANKINGS

(75) Inventors: Preetha Chatterjee, Seattle, WA (US); Gregory Gridin, Redmond, WA (US); Janna Hamaker, Issaquah, WA (US); Eugene Kalenkovich, Sammamish, WA (US); Tom Killalea, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 614 days.

(21) Appl. No.: 13/022,516

(22) Filed: Feb. 7, 2011

(51) Int. Cl.
*G06F 7/00* (2006.01)
*G06F 17/30* (2006.01)
*G06F 17/00* (2006.01)
*G06F 17/20* (2006.01)
*G06F 17/21* (2006.01)

(52) U.S. Cl.
USPC ........... 707/748; 707/736; 715/230; 715/231; 715/232; 715/233

(58) Field of Classification Search
None
See application file for complete search history.

(56) References Cited

U.S. PATENT DOCUMENTS

| | | | |
|---|---|---|---|
| 5,867,811 A * | 2/1999 | O'Donoghue | 704/1 |
| 7,072,846 B1 * | 7/2006 | Robinson | 705/7.32 |
| 8,266,154 B2 * | 9/2012 | Guo et al. | 707/748 |
| 2006/0161578 A1 * | 7/2006 | Siegel et al. | 707/102 |
| 2008/0005101 A1 * | 1/2008 | Chandra | 707/5 |
| 2008/0195657 A1 * | 8/2008 | Naaman et al. | 707/104.1 |

OTHER PUBLICATIONS

Azad, Khalid, 'An Intuitive Guide to Exponential Functions & e', May 1, 2007, web article on URL: http://betterexplained.com, pp. 1-10.*
Neilsen et al, 'Measuring usability: preference vs. performance', Apr. 1994, ACM, vol. 37, No. 4, pp. 66-75.*

* cited by examiner

*Primary Examiner* — Ajay Bhatia
*Assistant Examiner* — Cheryl M Shechtman
(74) *Attorney, Agent, or Firm* — Lee & Hayes, PLLC (57) ABSTRACT

Techniques for ranking electronic content items include analyzing annotations made in the content items. Specifically, the number of annotations and the number of people making the annotations can be analyzed to produce a popularity ranking of different content items.

32 Claims, 5 Drawing Sheets

ANNOTATION-BASED CONTENT RANKINGS

BACKGROUND

Books are increasingly purchased electronically through online sources, and consumed on electronic devices. When reading a book on an electronic device, a user's experience can be enhanced by features such as annotations. Annotations may include highlighting, underlining, commenting, editing, and so forth, and may be enabled by electronic book reader hardware and software.

In some environments, users may have their annotations collected and reported to a central web service, such as the service from which the users have purchased their electronic books. This enables the annotations to be archived on behalf of the users, and for the users to transfer their annotations to different reader devices.

Users may also in some environments share their annotations with other users. In some situations, the central web service may aggregate annotations from users, and may share the aggregated annotations with other users so that people can see what others have found interesting or noteworthy in an electronic book.

For example, an individual user may choose to share their personal annotations with one or more friends. Similarly, users may subscribe to the annotations or notes created by another person. In addition, a service may analyze collected annotations from different people, identify the most popular annotations, and distribute those annotations to users who choose to see them.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

This disclosure describes systems and techniques in which electronic book annotations can be analyzed to determine relative popularity of electronic books and other content items. A ranking for a particular electronic book is calculated based on the number of users who have made annotations in the book and the number of annotations made by each user. In one embodiment, the ranking is calculated as the product of two functions:
  a first function based on the number of users N making annotations, where the output of the first function has an upward slope that increases with N; and
  a second function based on the number of annotations per user, where the output of the second function has an upward slope that decreases with the number of annotations per user.

In the embodiment described herein, the first function is a logarithmic function, and the second function is an exponential function. The second function may be based on the geometric mean of the number of annotations made per user.

The contributions of annotations to the popularity rankings are made to decay over time, so that more recently received annotations are emphasized relative to less recently received annotations. In the described embodiment, the contributions of individual annotations are subject to an exponential decaying function that increasingly deemphasizes annotations as a function of the time since they were made.

Example Architecture

Figure 1:
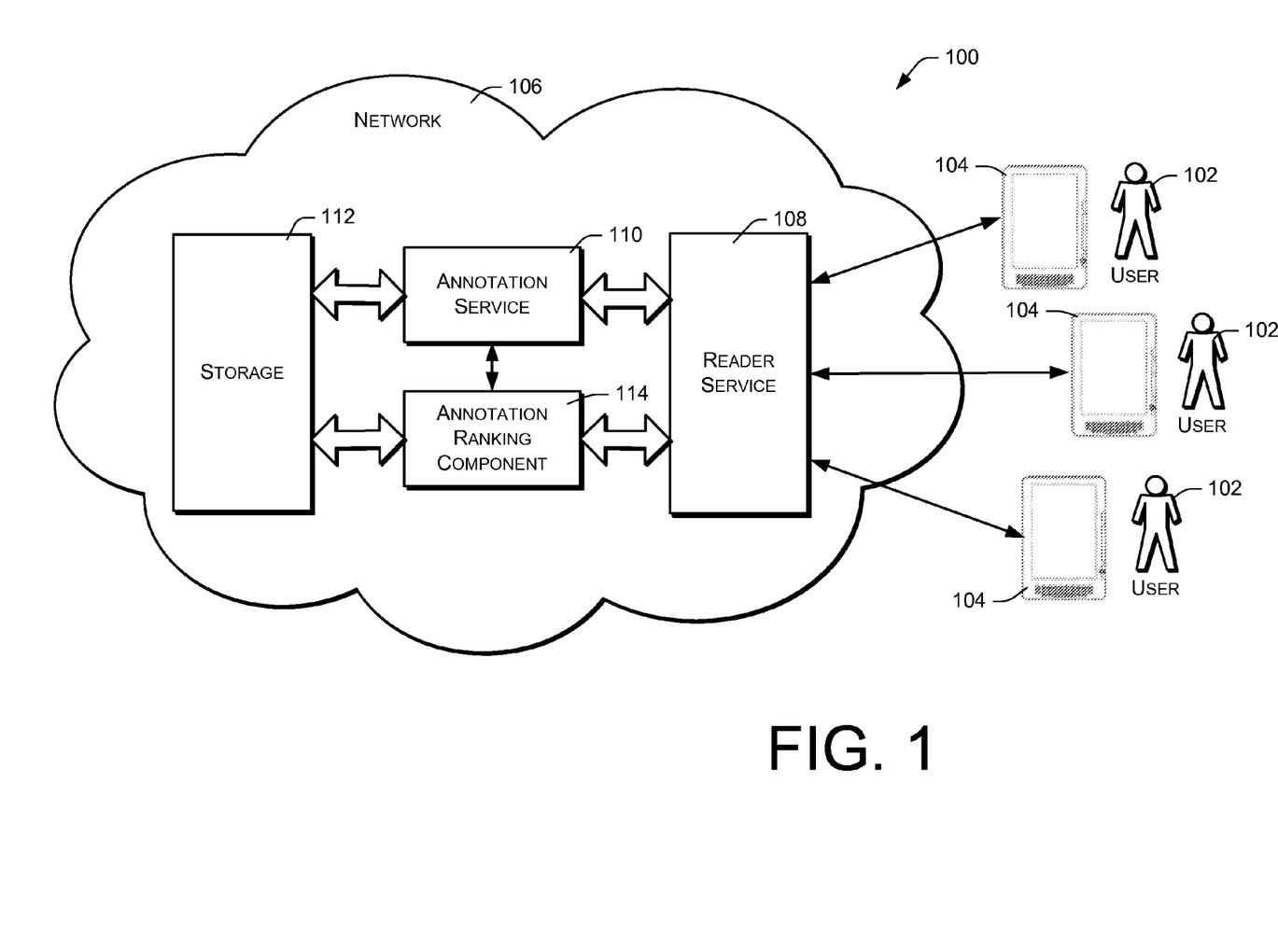
FIG. 1 is a block diagram illustrating a cloud-based environment that includes components for ranking content items based on annotations made within the content items.

FIG. 1 shows an online environment 100 in which annotation services are provided. The online environment 100 includes a plurality of users 102, each of which has or is associated with an electronic book reader 104 (also referred to herein as an electronic reader). Although FIG. 1 illustrates three users 102 and book readers 104, the described techniques can of course be used with any number of users and electronic book readers. In addition, a single user 102 may use a plurality of electronic book readers 104.

Each electronic reader 104 has a display upon which electronic content such as electronic books (eBooks) may be rendered. The terms content, content item, and "eBook" refer to essentially any form of textual data that may be consumed on a device, such as digital books, audio books, electronic magazines, papers, journals, periodicals, documents, instructional materials, course content, music, movies, and so on.

The electronic readers 104 may be handheld devices or other small, light-weight, portable devices upon which eBooks and other content can be rendered and conveniently viewed in a manner similar to viewing a paper book. Examples of other handheld electronic readers include flat form-factor devices such as tablets, pads, smartphones, personal digital assistants (PDAs), etc.

In some embodiments, the electronic readers 104 may comprise dedicated-purpose eBook reader devices, having flat-panel displays and other characteristics that mimic the look, feel, and experience offered by paper-based books. For example, such eBook reader devices may have high-contrast, black-and-white or color, flat-panel displays that appear similar to a printed page and that persist without frequent refreshing. Such displays may consume very negligible amounts of power, so that the eBook reader devices may be used for long periods without recharging or replacing batteries. In some instances, these readers may employ electrophoretic displays.

In the example of FIG. 1, the electronic readers 104 have networking capabilities. For example, the electronic readers 104 may have wireless communication interfaces that allow communication though a network 106. The wireless communications interfaces may utilize WiFi, cellular, or other wireless data and networking technologies.

The network 106 may be any type of communication network, including a local-area network, a wide-area network, the Internet, a wireless network, a wide-area network (WWAN), a cable television network, a telephone network, a cellular communications network, combinations of the foregoing, etc. Services, sometimes referred to as "cloud-based" services, may be provided from the network 106. In FIG. 1, the network 106 is represented as a cloud, and network-based services relevant to this discussion are shown as blocks within the cloud.

In the described embodiment, the electronic readers 104 include nonvolatile storage capabilities so that electronic content items can be downloaded and stored in their entirety on the electronic readers. Once an eBook has been stored by an electronic reader, it can be displayed and read at any time, whether or not the electronic reader is connected to a network.

Each electronic reader 104 may be configured with account information corresponding to a particular user 102. Each user may have multiple electronic readers, which may synchronize with each other so that a user may stop reading on a first device and continue reading on a second device, at the same location that the user left off in the first device.

In the configuration illustrated by FIG. 1, the electronic readers 104 may obtain content items from an online reader service 108. The reader service 108 may be accessed using the networking capabilities of the electronic readers 104. The reader service 108 may be accessible through other means as well, such as by connection to intermediary devices like personal computers, different types of mobile devices, and so forth. In FIG. 1, the reader service is illustrated as a network-based or cloud-based service, available over a public network such as the Internet. The electronic readers 104 may be configured to allow the users 102 to conveniently browse for content and content items from the reader service 108, and to purchase and download selected content items from the reader service 108.

Various applications and user interfaces may be used in conjunction with the electronic readers 104 to interact with the reader service 108, such as Internet browser programs that allow a user to interactively engage different online services. In addition, the reader service 108 may expose lower-level interfaces or APIs (application programming interfaces) through the network 106, through which devices and programs can access the underlying functionality of the reader service 108 without direct user interaction. For example a user may interactively purchase an eBook or other content item using a personal computer or some device other than the electronic reader device 104. The electronic reader 104 may periodically communicate with the reader service 108 to perform background synchronization or other housekeeping, and may automatically (without specific user intervention) download any content that has been purchased.

The reader service 108 might be implemented in some embodiments by an online merchant or vendor. Electronic books and other electronic content might be offered for sale by such an online merchant, or might be available to members or subscribers for some type of periodic or one-time fee. In some circumstances, eBooks or other content might be made available without charge.

The reader service 108 may include a client interface through which electronic readers 104 and other client interact with the reader service 108. The client interface may include a virtual storefront or other type of online interface for interaction with consumers and/or devices. The client interface may expose a graphical, web-based user interface that can be accessed by human users to browse and obtain (e.g., purchase, rent, lease, etc.) content items such as eBooks. The client interface may also expose programmatic interfaces or APIs that entities and devices can use to obtain digital content items and related services.

In the configuration of FIG. 1 the reader service 108 includes or utilizes the services of other functional components, illustrated as blocks within the larger dashed block representing reader service 108. These functional components, which will be described in more detail below, may be implemented and provided by way of a single installation and/or service provider, or may exist as independent services that communicate with each other using various means. Note that the illustrated configuration represents a logical organization of services and functionality, intended to facilitate description and explanation. However, the services and functionality represented in FIG. 1 may be implemented in many different ways, with various different divisions of responsibilities.

In the described embodiment, the reader service 108 provides an annotation service 110. The reader service 108 may also implement or support additional services.

In addition, the reader service 108 provides and/or has access to support components and services, including storage 112. The storage 112 may include repositories, databases, cloud-based storage services, electronic memory, and so forth. The storage 112 may be utilized by the reader service 108 as a content repository to store eBooks and other electronic content for consumption on the reader devices 104. The storage 112 may also be utilized by other services, including the annotation service 110.

The annotation service 110 can be accessed through the reader service 108 to provide various types of annotation services to users 102. Depending on the capabilities of the electronic readers 104, users may annotate different items of electronic content. Annotations may include highlights, underlining, comments, ratings, tags, corrections, and other items of information relating to specific locations within the electronic content. The annotations can be stored locally on the electronic readers, but may also be transmitted to the annotation service 110. User annotations might be archived for various reasons, such as for backup and sharing. For example, a user may at some point delete an annotated eBook from his or her electronic reader 104, and at some later time may re-obtain the same eBook from the reader service 108. Using the annotation service 110, the annotations may have been archived, and may be available for restoration when the user re-obtains the eBook or reloads the eBook onto his or her electronic reader 104. As another example, the annotation service 110 may implement annotation sharing, where annotations from one or more users are shared with one or more other users.

Content Ranking

The reader service 108 may implement or utilize an annotation ranking component or module 114, which is configured to rate or rank the popularity of electronic content items based on annotations within those content items. Rankings such as this may be shown to users in conjunction with other information about content items, as being relevant to users' decisions whether or not to purchase particular content items. For example, some users may only be interested in content items having relatively high annotation rankings. Rankings based on annotations may also be used for other purposes, such as for determining recommendations for particular users based on their previous histories of purchases, ratings, and annotations.

The annotation ranking component 114 communicates with the annotation service 110 to obtain data or statistics regarding annotations. In particular, the annotation ranking may obtain, with respect to any particular content item, the number of users who have made annotations within the content item and the number of annotations made by each user. This annotation data may also indicate a time or time period for each annotation, or the annotation data may be grouped or summarized by time period. For example, the data may be grouped by day, week, or month. For each time period, the annotation data might indicate the number of users who made annotations in the content item during that time period, and how many annotations each user made during that time period. Note that instead of indicating the number of annotations made by each user, the data may indicate an average or mean of the number of annotations made by each user. In the embodiment described herein, the data may indicate the geometric mean of the number of annotations made by each user. Thus, for each period such as a day, and for each content item, the annotation data may indicate the number of users who made annotations and the geometric mean of the number of annotations made by the individual users.

The annotation ranking component 114 uses the annotation data to calculate a ranking for each content item. The ranking for a particular content item can be based at least on (a) the number of users who have made annotations in the content item and (b) the geometric mean of annotations made by the users in the content item.

In the embodiment described herein, the ranking for any particular time period is a combination of two functions:
- a first function based on the number of users N making annotations in the content item during the time period, where the output of the function has an upward slope that increases with N; and
- a second function based on the geometric mean of the number of annotations per user in the content item during the time period, where output of the second function has an upward slope that decreases with the geometric mean of the number of annotations per user in the content item during the time period.

In some embodiments, such as the one described herein, the ranking comprises or is some based at least in part on the product of the first and second functions.

As a specific example, the ranking for any particular time period for a given content item may be calculated as follows:

$$\ln(N) * \exp(M(\text{annotations/user}))$$

in which
- ln( ) is the natural logarithm function;
- N indicates the number of individual people who made the annotations in the content item during the time period;
- exp( ) is the exponential function;
- M(annotations/user) is the mean or geometric mean of the number of annotations made per user during the time period.

In some embodiments, it may be desired to calculate rankings in such a way as to reflect current popularity—to emphasize more recent annotations relative to less recent annotations. This can be done by weighting the contributions of annotations based on their age. Specifically, the contributions of annotations can be calculated so that they decay over time. Specific examples of how to implement this will be described below.

Figure 2:
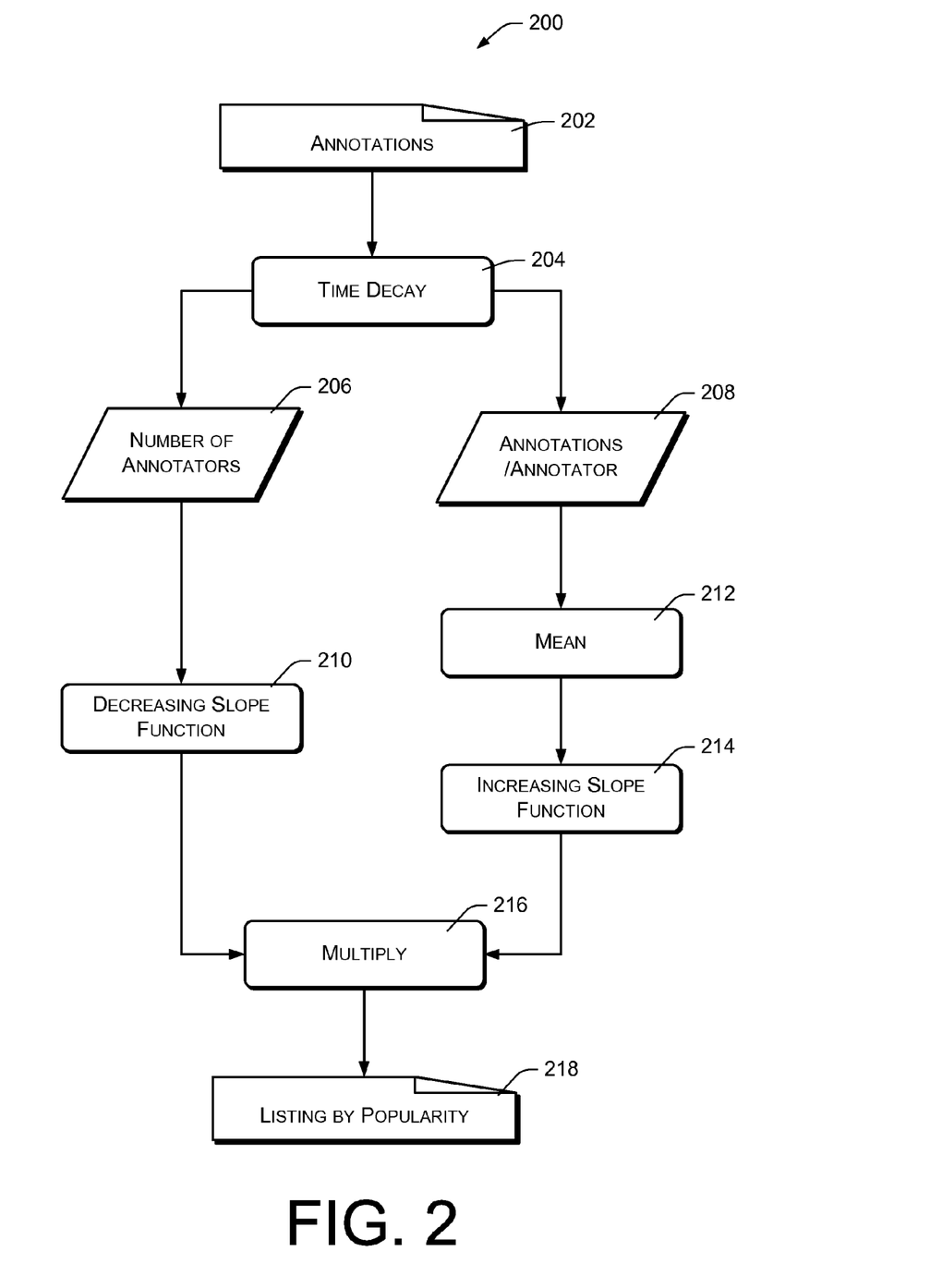
FIGS. 2 and 3 are flow diagram of illustrative processes of ranking content items based on annotations made within the content items.

FIG. 2 shows an example procedure 200 that may be performed by the reader service 108 to rank an electronic content item based on its annotations. At 202, the annotation service 110 receives annotations made by different people in various content items. The annotations can be time-stamped to indicate the time of their creation or reception.

At 204, the reader service applies a time decay to the annotations. More specifically, the value or contribution of each annotation is decayed by a fractional factor that decreases over time. Some embodiments may use an exponentially decaying function, so that annotation contributions decay exponentially with time. For example, annotations may be multiplied by the following time decay function:

$$\exp(-T/C)$$

in which:
- T indicates time since each annotation was made; and
- C comprises a constant which in some embodiments may be approximately equal to 25.

Application of such a time delay function at 204 results in a weighted number of annotators 206 and a weighted number of annotations per annotator 208.

At 210, a positive, decreasing slope function is applied to the number of annotators 206. As will be described below, this may be a natural logarithm function.

At 212, the mean of the number of annotations per annotator 208 is calculated. In certain embodiments, the mean is calculated as the geometric mean.

At 214, a positive, increasing slope function is applied to the mean of the number of annotations per annotator. As will be described below, this may be an exponential function.

At 216, the results of the decreasing slope function 210 and the increasing slope function 214 are multiplied. This results in a ranking for each content item. At 218, the reader service may list content items, ordered in accordance with their popularity rankings, or may utilize the calculated rankings for other purposes.

In practice, rankings may be calculated for different time periods and summed to produce a cumulative ranking, with older rankings being weighted less than newer rankings. Before being summed, older rankings may be multiplied by a decay factor so that their contribution to the cumulative ranking decrease with time. In the described embodiment, older rankings are factored by an exponential function of the negative of the age of the rankings. For example, the decay factor may be calculated as $$\exp(-K * (T))$$

in which
- exp( ) is the exponential function;
- K is a fractional constant equivalent to 1/C; and
- T is the age of the annotations.

This is an exponentially decaying function, which causes the contributions of annotations and rankings to decay exponentially with time. In the described embodiment, K may have a value of 1/25 (0.04). The value of K may of course be manipulated to result in more or less rapid decay with age.

Using the techniques described above, an individual ranking based on annotations from time periods $T_{-n}$ through $T_0$ may be calculated as follows:

$$\sum_{t=T_{-n}}^{T_0} [\exp(-K * (T_0 - t)) * \ln(N_t) * \exp(M_t(\text{annotations/user}))]$$

in which
- $T_0$ is the current time period;
- $T_{-n}$ is one of a plurality of previous time periods;
- exp( ) is the exponential function;
- K is a fractional constant;
- ln( ) is the natural logarithm function;
- $N_t$ indicates the number of individual people who made the annotations in the content item during the time period t; and
- $M_t$(annotations/user) is the mean or geometric mean of the number of annotations made per user during the time period t.

$M_t$(annotations/user) can be calculated as $$\frac{\Sigma_{users} \ln(A_{t,user})}{N_t}$$

in which
- user indicates an individual person who has made one or more annotations in the content item; and
- $A_{t,user}$ indicates the number of annotations made by user in the content item during the time period t.

Rather than calculating rankings over all time, a current ranking can be calculated as a function of an old or existing ranking, summed with the ranking for the current time period, as follows:

$$\exp(-K^*(T_0-T_{-1}))^*p + \ln(N_{T_0})^*\exp(M_{T_0}(\text{annotations}/\text{user}))$$

in which:
- K comprises a fractional constant;
- $T_0$ indicates the time of the ranking;
- p is a previously calculated ranking of the content item;
- $T_{-1}$ indicates the time of the p ranking;
- $N_{T_0}$ indicates the number of individual people who made the annotations in the content item during the time period from $T_{-1}$ to $T_0$; and
- $M_{T_0}$ (annotations/user) is the geometric mean of the number of annotations per user during the time period from $T_{-1}$ to $T_0$.

The geometric mean, $M_{T_0}$(annotations/user), can be calculated as $$\frac{\Sigma_{users}\ln(A_{T_0,user})}{N_{T_0}}$$

in which:
- user indicates an individual person who has made one or more annotations in the content item; and
- $A_{T_0,user}$ indicates the number of annotations made by user in the content item during the time period from $T_{-1}$ to $T_0$.

Figure 3:
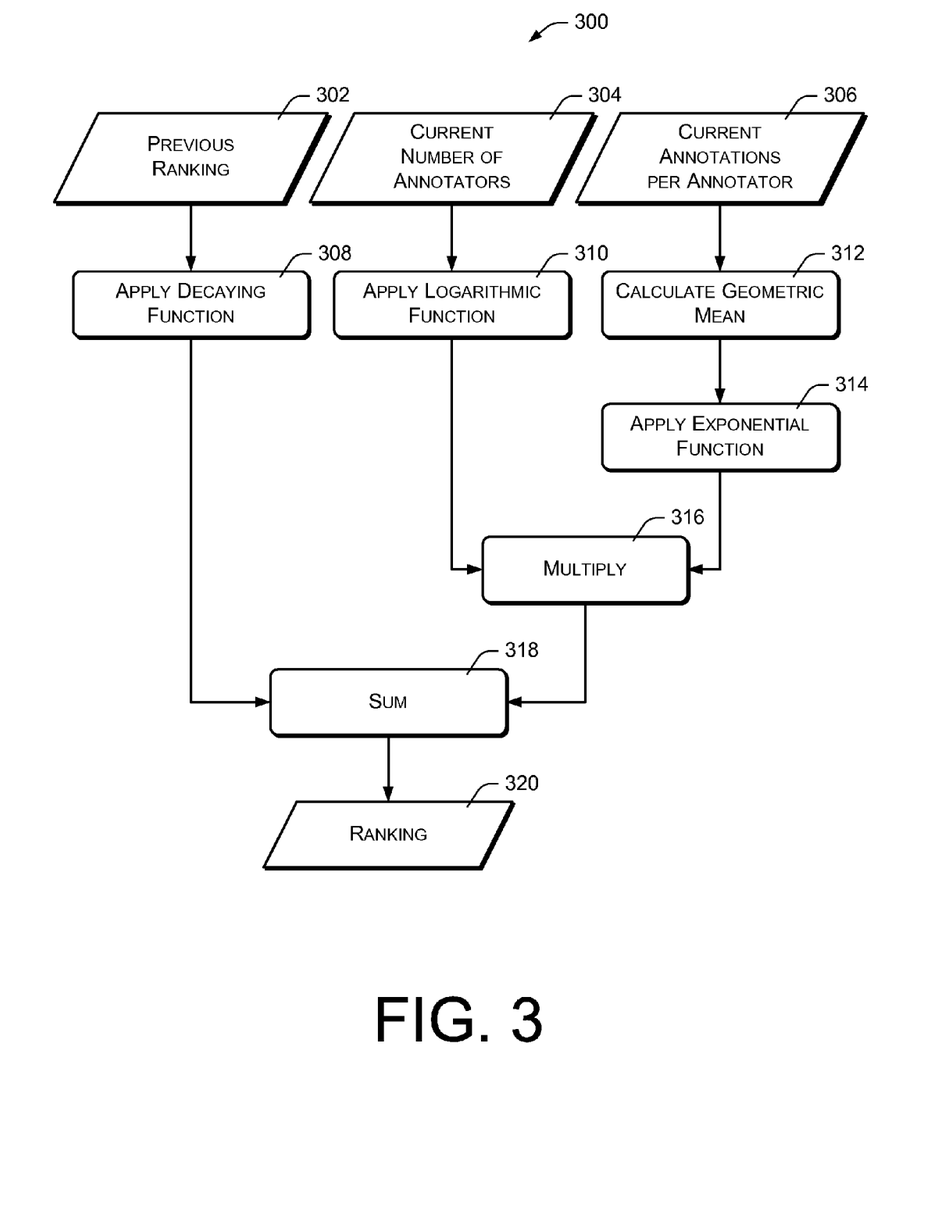

FIG. 3 illustrates these calculations, generally designated by reference numeral 300, as a flowchart. The calculation 300 begins with three values: a previous ranking 302, the number of annotators 304 who made annotations during the current time period, and the number of annotations per annotator 306 in the current time period. Each of these values is with respect to a particular content item.

At 308, a decaying function is applied to the previous ranking. As described above, the decaying function may impose an exponential decay with time. In the described embodiment, the decaying function comprises $\exp(-K^*(T))$, in which K is a fractional constant and T is the time since the last time period.

At 310, a logarithmic function is applied to the number of annotators value 304.

At 312, the geometric mean of the annotations per annotator value 306 is calculated, and at 314 an exponential function is applied to the result of 312.

At 316, the result of the logarithmic function at 310 is multiplied with the result of the exponential function at 314. The resulting product is then summed at 318 with the result of the decaying function 308. This produces a ranking value 320.

Note that the techniques described above may be applied to many different types of content items. For purposes of this discussion, a content item can be defined as an entire work or book, as a collection of works, or as a portion of a work. For example, a content item may comprise a single chapter of a book, and the chapters may be ranked separately based on their annotations to determine relatively popularity of the chapters.

Example Electronic Reader

Figure 4:
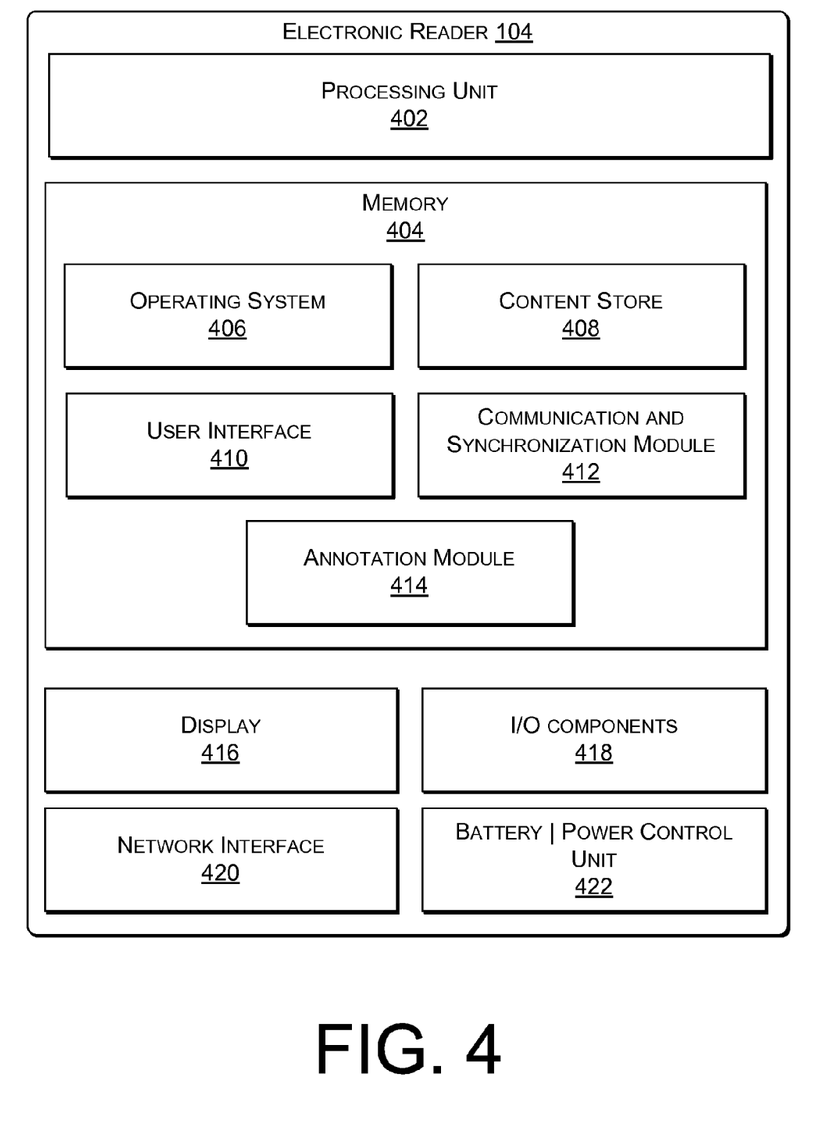
FIG. 4 is a block diagram illustrating components of an electronic book reader device that may be used in conjunction with the techniques described herein.

FIG. 4 is a high-level block diagram showing an example of the electronic reader 104, indicating components that are relevant to this discussion. In this embodiment, the electronic reader 104 is a dedicated eBook reader device, designed specifically for the purpose of emulating a traditional book-like reading experience. To that end, it is has a size and weight that is comparable to a paper-based book, and uses a monochrome display having a contrast ratio that approaches that of the printed page.

In a very basic configuration, the electronic reader 104 includes a processing unit 402 composed of one or more processors, and memory 404. Depending on the configuration of the eBook reader 104, the memory 404 may be a type of computer storage media and may include volatile and non-volatile memory. Thus, the memory 404 may include, but is not limited to, RAM, ROM, EEPROM, flash memory, or other memory technology, or any other medium which can be used to store media items or applications and data which can be accessed by the electronic reader 104.

The memory 404 may be used to store any number of functional components that are executable on the processing unit 402. In many embodiments, these functional components comprise instructions or programs that are executable by the processing unit 402, and that implement operational logic for performing the actions attributed above to the electronic reader 104. In addition, the memory 404 may store various types of data that are referenced by executable programs.

The memory 404 may store an operating system 406 and a content store 408 to store one or more content items. A user interface module 410 may also be provided in the memory 404 and executed on the processing unit 402 to provide for user operation of the electronic reader 104. The UI module 410 may provide menus and other navigational tools to facilitate selection and rendering of content items. The UI module 410 may further include a browser or other application that facilitates access to sites over a network, such as websites or online merchants, or other sources of electronic content items or other products.

A communication and synchronization module 412 is stored in the memory 404 and executed on the processing unit 402 to perform management functions in conjunction with one or more services, such as the reader service 108 discussed above. In some embodiments, the communication and synchronization module 412 communicates with the reader service 108 to receive eBooks and other content items.

The electronic reader 104 may also include an annotation module 414 allowing a user to enter annotations and to communicate annotations with the annotation service 110, in accordance with the techniques described above.

The electronic reader 104 may further include a display 416 upon which electronic books are rendered. In one implementation, the display 416 uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some exemplary electronic paper displays that may be used with the implementations described herein include bi-stable LCDs, MEMS, cholesteric, pigmented electrophoretic, and others. One exemplary electronic paper display that may be used is an E Ink-brand display. Touch sensitive technology may be overlaid or integrated with the electronic paper display technology to enable user input via contact or proximity to the screen.

The electronic reader 104 may further be equipped with various input/output (I/O) components 418. Such components may include various user interface controls (e.g., buttons, joystick, keyboard, etc.), audio speaker, connection ports, and so forth.

A network interface 420 may support both wired and wireless connection to various networks, such as cellular networks, radio, WiFi networks, short range networks (e.g., Bluetooth), IR, and so forth. The network interface 420 facilitates receiving electronic books and other content as described herein.

The electronic reader 104 may also include a battery and power control unit 422. The power control unit operatively controls an amount of power, or electrical energy, consumed by the electronic reader. Actively controlling the amount of power consumed by the electronic reader may achieve more efficient use of electrical energy stored by the battery.

The electronic reader 104 may have additional features or functionality. For example, the electronic reader 104 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Example Server

Figure 5:
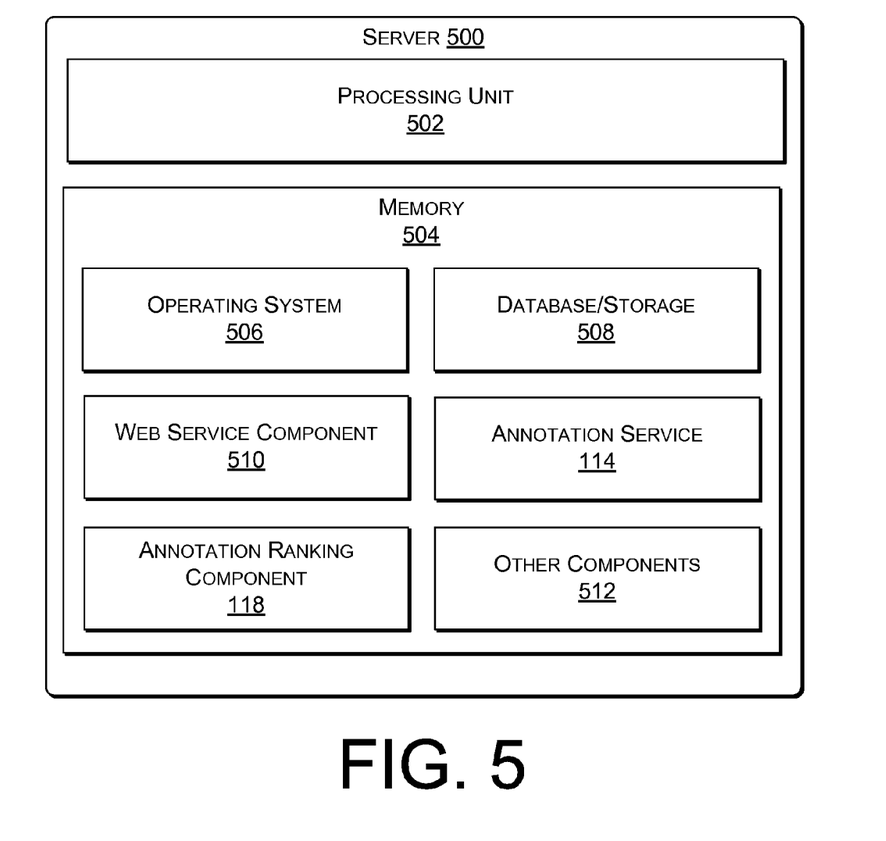
FIG. 5 is a block diagram illustrating components of a server that may be used to implement some of the techniques described herein.

FIG. 5 illustrates relevant components of a server 500 that may be used to implement the functionality of the reader service 108 and/or its various components, such as the annotation service 110 and the annotation ranking component 114. Generally, the reader service 108 and its services may be implemented by one or more servers, with the various functionality described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 500 may comprise a processing unit 502 composed one of one or more processors, and memory 504. Depending on the configuration of the server 500, the memory 504 may be a type of computer storage media and may include volatile and nonvolatile memory. Thus, the memory 504 may include, but is not limited to, RAM, ROM, EEPROM, flash memory, or other memory technology.

The memory 504 may be used to store any number of functional components that are executable by the processing unit 502. In many embodiments, these functional components comprise instructions or programs that are executable by the processing unit 502, and that when executed implement operational logic for performing the actions attributed above to the reader service 108. In addition, the memory 504 may store various types of data that are referenced by executable programs, including content items that are supplied to consuming devices such as electronic reader 104.

Functional components stored in the memory 504 may include an operating system 506 and a database 508 to store content items, annotations, maps, etc. Functional components of the server 500 may also comprise a web service component 510 that interacts with remote devices such as computers and media consumption devices.

The server 500 may also implement the annotation service 110 and the annotation ranking component 114 shown in FIG. 1

The server 500 may of course include many other logical, programmatic, and physical components, generally referenced by numeral 512, of which those described above are merely examples that are related to the discussion herein.

CONCLUSION

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

The invention claimed is:

1. A computer-implemented method of determining popularity of content items based at least in part on annotations made in each of the content items, the method comprising:
   under control of one or more processors configured with executable instructions,
   receiving annotations made by different people in the content items;
   determining an exponential function of a geometric mean of a number of annotations made per person during a time period;
   determining a natural log of a number of the different people who made the annotations in the content item during the time period; and
   determining a ranking of the content items based at least on a summation of the product of the exponential function, the natural log and a decay function.

2. The computer-implemented method of claim 1, wherein the geometric mean is calculated based on the number of annotations made by a particular user during a time period and the number of people who made annotations during the time period.

3. The computer-implemented method of claim 1, wherein the decay function is based in part on a fractional constant.

4. The computer-implemented method of claim 1, wherein the content items comprise electronic books.

5. The computer-implemented method of claim 1, wherein the annotations comprise highlighting.

6. The computer-implemented method of claim 1, wherein the annotations comprise notes.

7. The computer-implemented method of claim 1, wherein the content items comprise portions of electronic books.

8. The computer-implemented method of claim 1, further comprising listing the content items ordered in accordance with their rankings.

9. A system comprising:
the one or more processors; and
computer-readable media containing instructions that are executable by the one or processors to perform the method of claim 1.

10. A computer-implemented method of determining popularity of content items based at least in part on annotations made in each of the content items, the method comprising:
under control of one or more processors configured with executable instructions,
receiving annotations made by different people in the content items;
determining an exponential function of a geometric mean of a number of annotations made per person during a time period;
determining a natural log of a number of the different people who made the annotations in the content items during the time period;
determining a ranking of the content items based at least on the exponential function, the natural log and a decay function; and
listing the content items based on the ranking.

11. The computer-implemented method of claim 10, wherein the geometric mean is calculated based on the number of annotations made by a particular user during a time period and the number of people who made annotations during the time period.

12. The computer-implemented method of claim 10, wherein the content items comprise electronic books.

13. The computer-implemented method of claim 10, wherein the annotations comprise highlighting.

14. The computer-implemented method of claim 10, wherein the content items comprise portions of electronic books.

15. The computer-implemented method of claim 10, further comprising listing the content items ordered in accordance with their rankings.

16. A system comprising:
the one or more processors; and
computer-readable media containing instructions that are executable by the one or more processors to perform the method of claim 10.

17. A computer-implemented method of ranking content items based at least in part on annotations made in each of the content items, the method comprising:
under control of one or more processors configured with executable instructions,
receiving, at the one or more processors, annotations made by different people in the content items; and
ranking the content items based at least on:
an exponential function of a geometric mean of a number of the annotations made in each of the content items; and
a number of the people who made the annotations in each of the content items.

18. The computer-implemented method of claim 17, wherein the annotations comprise highlights.

19. The computer-implemented method of claim 17, wherein the ranking emphasizes more recently received annotations relative to less recently received annotations.

20. The computer-implemented method of claim 17, wherein the ranking comprises applying a decaying function to increasingly deemphasize annotations as a function of the time since they were made.

21. The computer-implemented method of claim 17, wherein the ranking comprises applying a decaying function to increasingly deemphasize annotations as an exponential function of the time since they were made.

22. The computer-implemented method of claim 17, wherein the exponential function of the geometric mean is based at least in part on the number of annotations made by individual people in an individual content item.

23. The computer-implemented method of claim 17, wherein the ranking is based at least in part on an exponential function of a geometric mean of the number of annotations made by different people in each of the content items.

24. The computer-implemented method of claim 17, wherein the ranking is based at least in part on a logarithm of the number of individual people who made the annotations in each individual content item.

25. The computer-implemented method of claim 17, wherein the ranking is based at least in part on the product of:
a mean of the number of annotations made by individual people in an individual content item; and
a logarithm of the number of individual people who made the annotations in each individual content item.

26. The computer-implemented method of claim 17, wherein the ranking for a particular content item comprises:

$$\sum_{t=T_{-n}}^{T_0} [\exp(-K*(T_0-t))*\ln(N_t)*\exp(M_t(\text{annotations}/\text{user}))]$$

in which:
K comprises a fractional constant;
$T_0$ indicates a current time period;
$T_{-n}$ is one of a plurality of previous time periods;
$N_t$ indicates the number of individual people who made the annotations in the content item during the time period t; and
$M_t(\text{annotations}/\text{user})$ is a geometric mean of the number of annotations made per person during the time period t.

27. A computer-implemented method of ranking electronic content items based at least in part on annotations made in each of the electronic content items, the method comprising:
under control of one or more processors configured with executable instructions,
receiving annotations made by different people in the electronic content items; and
ranking the electronic content items based at least on (a) a logarithmic function of a number of people who made the annotations in each electronic content item and (b) an exponential function of a geometric mean of the number of annotations made by the different people in each electronic content item.

28. The computer-implemented method of claim 27, wherein the logarithmic function comprises:

$$\ln(N)$$

in which N indicates the number of individual people who made the annotations in the electronic content item.

29. The computer-implemented method of claim 27, wherein the exponential function comprises:

$$\exp(M(\text{annotations/user}))$$

in which M(annotations/user) indicates a geometric mean of annotations made per person in the electronic content item.

30. The computer-implemented method of claim 27, wherein the ranking comprises decaying annotation contributions in accordance with the following factor:

$$\exp(-T/C)$$

in which:
T indicates time since each annotation was made; and
C comprises a constant.

31. The computer-implemented method of claim 27, wherein:
the logarithmic function comprises:

$$\ln(N);$$

the exponential function comprises:

$$\exp(M(\text{annotations/user}));$$

the ranking comprises decaying annotation contributions to the ranking in accordance with the following factor:

$$\exp(-T/C);$$

in which:
M(annotations/user) indicates a geometric mean of annotations made per user in the electronic content item
in which N indicates the number of individual people who made the annotations in the electronic content item.
T indicates time since each annotation was made; and
C comprises a constant.

32. A system comprising:

the one or more processors; and computer-readable media containing instructions that are executable by the one or processors to perform the method of claim 27.

* * * * *